(12) United States Patent
Stevenson et al.

(10) Patent No.: US 11,094,101 B2
(45) Date of Patent: Aug. 17, 2021

(54) INTEGRATION OF 3RD PARTY GEOMETRY FOR VISUALIZATION OF LARGE DATA SETS SYSTEM AND METHOD

(71) Applicant: AVEVA Software, LLC, Lake Forest, CA (US)

(72) Inventors: David Matthew Stevenson, Cambridge (GB); Chase Laurendine, Harvest, AL (US); Paul Antony Burton, Cambridgeshire (GB)

(73) Assignee: AVEVA Software, LLC, Lake Forest, CA (US)

( * ) Notice: Subject to any disclaimer, the term of this patent is extended or adjusted under 35 U.S.C. 154(b) by 0 days.

(21) Appl. No.: 16/565,596

(22) Filed: Sep. 10, 2019

(65) Prior Publication Data
US 2020/0082594 A1    Mar. 12, 2020

Related U.S. Application Data

(60) Provisional application No. 62/729,371, filed on Sep. 10, 2018.

(51) Int. Cl.
*G06T 15/00* (2011.01)
*G06T 15/40* (2011.01)
*G06F 9/54* (2006.01)
*G06T 19/00* (2011.01)

(52) U.S. Cl.
CPC .............. *G06T 15/005* (2013.01); *G06F 9/54* (2013.01); *G06T 15/405* (2013.01)

(58) Field of Classification Search
CPC ......... G06F 9/54; G06F 9/547; G06T 15/005; G06T 15/405; G06T 19/00
See application file for complete search history.

(56) References Cited

U.S. PATENT DOCUMENTS

| 8,907,941 B2 | 12/2014 | Gay et al. |
| 2006/0192783 A1* | 8/2006 | Kass ............... G06T 11/203 345/473 |
| 2014/0098118 A1 | 4/2014 | Liu et al. |
| 2016/0092152 A1* | 3/2016 | Portugal ............ G06F 3/147 345/2.1 |

FOREIGN PATENT DOCUMENTS

| KR | 10-2015-0087446 A | 7/2015 |
| WO | 2018/080616 A1 | 5/2018 |

OTHER PUBLICATIONS

International Search Report and Written Opinon for International Application No. PCT/US2019/050283, dated Jan. 2, 2020, 10 pages.
Alberto Raposo et al, "Environ: Integrating VR and CAD in Engineering Projects", IEEE Computer Graphics and Applications, vol. 29, Issue 6, Nov. 3, 2009, pp. 91-95.

* cited by examiner

*Primary Examiner* — Sing-Wai Wu
(74) *Attorney, Agent, or Firm* — Greenberg Traurig, LLP

(57) ABSTRACT

A system provides the ability to import large engineering 3D models from a primary 3D rendering software into a secondary 3D rendering software that does not have the tools of the resources to render the larger 3D model on its own. The system uses a plugin to combine 3D data from the two software sources, and then return the combined 3D data to the secondary 3D rendering software. Components of the system can be remote or cloud based, and the system facilitates video streaming of 3D rendered models that can be manipulated on any computer capable of supporting a video stream.

20 Claims, 4 Drawing Sheets

INTEGRATION OF 3RD PARTY GEOMETRY FOR VISUALIZATION OF LARGE DATA SETS SYSTEM AND METHOD

RELATED APPLICATIONS

This application claims the benefit of and priority to U.S. Provisional Patent Application No. 62/729,371, filed Sep. 10, 2018, entitled "INTEGRATION OF 3RD PARTY GEOMETRY FOR VISUALIZATION OF LARGE DATA SETS SYSTEM AND METHOD", the entire contents of which are incorporated herein by reference.

BACKGROUND

As the fields of data analytics and engineering expand, mathematical models of concepts are now commonly transformed into three dimensional (3D) visual representations using computers: the virtual 3D models can be manipulated as if they were real world 3D objects. The benefits for such a transformation are numerous, and include, for example, the ability to virtually perform operations such as fitting objects together, testing interface connections, running simulations, determining finite stress points, and storing iterations of designs.

Often, it is necessary for multiple models from different file sources to be incorporated into a single rendering to execute the previously mentioned operations. In this case, it is necessary to import all the separate 3D object files into a single 3D rendering software application where it is then executed by the software. In the case of large engineering 3D models, the 3D rendering software may not support or contain the tools necessary to render the large engineering 3D models. In these cases, the engineering models must be created on a separate 3D rendering platform that comprises the engineering 3D model tools. However, because the 3D rendering software application does not support the functionality and rendering the separate 3D rendering platform provides, the 3D rendering software application must connect to and import the 3D model data from the separate 3D rendering platform.

In the current state of the art, there is no way to effectively establish a communication between a 3D rendering software application and a separate 3D rendering platform such that large engineering 3D model geometry can be imported and manipulated at an acceptable interactive rate. Therefore, there is a need for a system and method for integration of $3^{rd}$ party geometry for visualization of large data sets into a software application from a separate $3^{rd}$ party 3D rendering platform.

SUMMARY OF THE INVENTION

Some embodiments are directed to a system and methods for interactively integrating a first three-dimensional (3D) rendering into a secondary 3D rendering. In some embodiments, the system comprises a computer. In some embodiments, the system comprises one or more of at least one processor, at least one non-transitory computer-readable medium, at least one first 3D rendering software, at least one second 3D rendering software, and at least one calling operation. In some embodiments, the system comprises one or more of at least one processor code, at least one non-transitory computer-readable medium code, at least one first 3D rendering software code, at least one second 3D rendering software code, and at least one calling operation code, and a computer configured and arranged to store and/or execute one or more of the previously mentioned codes.

In various embodiments, a reference to at least one processor, at least one non-transitory computer-readable medium, at least one first 3D rendering software, at least one second 3D rendering software, and at least one calling operation is also a reference to its corresponding code. In various embodiments, a reference to a processor, a non-transitory computer-readable medium, a first 3D rendering software, a second 3D rendering software, and a calling operation is also a reference to multiple instances of each, where "a" or "the" is equivalent to "at least one."

According to some embodiments, the calling operation comprises instructions configured and arranged to send second 3D model data generated by the second 3D rendering software to the first 3D rendering software. The first 3D rendering software compares the first 3D model data to the second 3D model data in some embodiments. In various embodiments, the first 3D rendering software generates combined 3D model data comprising a combination of the first 3D model data and said second 3D model data. The combined 3D model data is return to the second 3D rendering software code in some embodiments. In various embodiments, the second 3D rendering software code generates a second 3D model rendering comprising the combined 3D model data. The second 3D model rendering can be manipulated in some embodiments. In some embodiments, upon manipulation of the second 3D model rendering, the calling operation is repeated resulting in a new second 3D model rendering comprising new combined 3D model data.

In some embodiments, the first 3D rendering software comprises a plugin. In some embodiments, the calling operation comprises a plugin calling operation comprising instructions. In some embodiments, the instructions are configured and arranged to cause said plugin to facilitate one or more of the following: receive said second 3D model data sent to the at least one first 3D rendering software; compare said first 3D model data to said second 3D model data; generate said combined 3D model data; return said combined 3D model data to the at least one second 3D rendering software.

In some embodiments, the second 3D rendering software comprises an application programming interface (API). According to some embodiments, said plugin calling operation comprises instructions configured and arranged to cause the API to facilitate one or more of the following: receive the second 3D model data; send the second 3D model data to the plugin; receive the combined 3D model data from said plugin.

According to various embodiments, the first 3D model data and the second 3D model data each comprise first and second z-values, respectively. In some embodiments, the first 3D model software generating the combined 3D model data comprises facilitating one or more of the following: comparing a first z-values to a second z-values; determining which first and second z-values are equal; creating a g-buffer. The g-buffer comprises the first and second z-values, in some embodiments, where each of said equal first and second z-values are each transformed into a single g-value stored in the g-buffer, thereby eliminating duplicate z-values. In some embodiments, a z-value is the measure of a distance which is perpendicular from a pixel on a projection plane to its corresponding 3D-coordinate on a polygon in world-space. In various embodiments, the g-buffer can comprise of a color, a normal, a depth and/or a unique ID of the logical geometry primitive from at least one of the first and second 3D model data.

In some embodiments, manipulation of a 3D rendering comprises using one or more computer interfaces to move, rotate, delete, animate, assign attributes to, test, label, or perform any other action associated with a 3D rendering software. According to some embodiments, the use of a g-buffer to create a combined rendering of first and second 3D model data where overlapping geometry is eliminated allows for interactive frame rates during manipulation that are less than or equal to 30 Hz, which greatly reduces latency as compared to the prior art.

Some embodiments comprise a computing device coupled to at least one user display and at least one non-transitory computer-readable medium, where the at least one non-transitory computer-readable medium includes instructions that when executed by the computing device, cause the computing device to perform operations of a plugin. In some embodiments, the operations cause coupling to a Unity API to extend one or more Unity render pipelines. In some embodiments, the operations cause a loading of at least one graphics file into the plugin to initialize a renderer of the plugin. In some further embodiments, each frame Unity API makes one or more callbacks to the plugin. In some other embodiments, the operations cause DirectX to render the at least one graphics file into one or more Unity frame buffers, and produce a "g-buffer" comprising color, normal, depth, and/or unique ID of a logical geometry primitive contributing to at least one pixel at each screen position of the at least one user display.

According to some embodiments, one or both of the first and/or second 3D rendering software is a cloud based 3D rendering software. According to various embodiments, systems and methods described herein are directed toward facilitating a rendering of three dimensional (3D) models generated at a local computer that can be manipulated using a remote computer (e.g., providing a visualization server process delivering interactive video streams of rendered 3D data to one or more network connections which have video playback capability). Advantages to local rendering of 3D models include the ability to upgrade local equipment when needed to support ever increasing complex 3D models, while gaining the ability to render 3D images on any remote computer that can support video streaming according to some embodiments. In some embodiments, the system uses a graphics processing unit (GPU) in combination with one or more processors and non-transitory computer readable mediums located at the local site to generate the 3D model. In some embodiments, a rendering of the 3D model is delivered to one or more remote computers over a connection as a video stream. The user can then manipulate the 3D model using various commands according to some embodiments. The system greatly reduces the impact of latency to the user's experience, and provide greater security due to being accessible only within a local network according to various embodiments. In some embodiments, the latency is less than 50 ms. In some embodiments, the reduced latency provided by the system allows for the interactive frame rates of 30 Hz or less over a network and/or internet connection. By centralizing the 3D data on a locally-accessible on-premises network, in some embodiments 3D models become highly accessible without need to replicate and/or copy the same 3D model on to each individual remote computer. This also provides enhanced security as model data usage may be restricted to a specific number of computers instead of multiple end user computers according to some embodiments. In addition, in some embodiments, multiple remote computers can access the same 3D model on the local computer intermittently or simultaneously.

Some embodiments of the invention include a system and process that can be hosted on any computer that awaits client connections. Some embodiments of the invention enable rendering remotely such that any computer able to display a rendering of one or more complex models without requiring any special hardware or software installation. In some embodiments, the connections can be used to send a real-time video stream generated by rendering a nominated 3D model on the local computer and encoding each frame at interactive rates. In some embodiments, the rendering from the local computer is delivered to the remote computer in the form of a video stream.

In some embodiments, once streaming begins, the remote computer can interact with the rendering to allow navigation, picking, panning, zooming, and other 3D model interactions by sending simple JavaScript Object Notation (JSON) commands to the local computer. In some embodiments, interactions that have a visual impact on the 3D view (e.g. change of view point) can trigger a new frame to be rendered on the local computer and streamed to the user as part of the video stream. Following a feedback loop of interacting, rendering, and/or streaming, the user can interact freely with a rendering of a 3D model on their remote computer according to some embodiments.

Some embodiments of the system can facilitate connections established by standard communication or streaming technology, including, but not limited to, H.264 video encoding and decoding, application programming interfaces (APIs), and HTML5 Web Sockets. In some embodiments, this allows a high degree of compatibility across different operating systems, enabling future applications to be web based (e.i., local computers accessed by remote computers through the web), rather than requiring the need to write multiple versions of applications or software for each supported operating system. In some embodiments, a GPU rasterizer can be utilized for streaming, thereby making it highly interactive (e.g., such as with the use of 30 Hz frame-rates). In some embodiments, any visualization using standard video streams can be produced without the need for any additional software/plugins except a standard HTML5 browser that supports Media Source Extensions and H264 encoded video, for example.

In some embodiments, the system can enable one or many local computer server processes running across multiple computers, virtual machines, and/or servers concurrently to support any number of remote computers.

Some embodiments can use GPU video encoders to produce the video stream from frames generated by a rendering engine (e.g., such as an AVEVA rendering engine). In some embodiments, ensuring high utilization of the GPU during both rendering and encoding of the 3D model can result in low latency following remoter computer interaction. The low latency is less than or equal to 50 ms in various embodiments. In some embodiments, the reduced latency provided by the system allows for the interactive frame rates of 30 Hz or less over a network and/or internet connection.

In some embodiments, at least one local computer can host one or more virtual and/or physical computers that can each run one or more servers to handle one or more incoming remote client requests from remote computers. In some embodiments, it is the responsibility of the remote computer to decode the video stream. In some embodiments, the video stream can be compatible with Media Source Extensions (MSE) to ensure good playback performance.

In some embodiments, a remote computer can couple to a local computer via a WebSocket and send a command to render a 3D model. In some embodiments, this action can reserve some GPU resources to render the 2D frame for encoding: an MP4 movie header is sent to the remote client to indicate the start of the video stream in some embodiments.

In some embodiments, a remote computer can issue commands to interact with the 3D model. In some non-limiting embodiments, the commands are issued via a mouse movement and/or click, finger touch, hand gesture, eye movement tracking, or any other method to send a digital signal. In some embodiments, the command modifies the local 3D model and triggers a new frame to be rendered and sent to a hardware encoder, and the new frame is then sent to the remote client as the next P-frame (delta from previous image). In some embodiments, the use of one or more hardware encoders and a high GPU/low CPU combination delivers the low latency required for such interaction.

In some embodiments, the cloud based 3D rendering software allows for viewing and manipulation on one or more remote computers. In some embodiments, the remote computers comprise displays. In some embodiments, the displays are remote displays remote from the one or more computers comprising the first and/or second 3D rendering software. According to various embodiments, the remote computers do not have the computing power (i.e., one or more processors and/or transitory/non-transitory computer-readable medium) to execute one or both of the first and/or second 3D rendering software. In some embodiments, the remote computers access one or both of the first and/or second cloud based 3D rendering software through a network and/or internet connection, where only a video stream supported by standard video coding software is needed to view the 3D model rendering.

In some embodiments, the plugin integrates a rendering engine (ARF) into the second 3D rendering software pipeline to render the 3D models, removing any limitation on size and performance. In some embodiments, users (e.g., customers) using the plugin will typically already have 2D or 3D models in a compatible format (e.g., such as in an .rfc or other conventional format), and so any additional conversion is no longer required, which can allow for more streamlined integration to other software applications.

Some embodiments of the invention include a second 3D rendering software plugin for a Windows platform which provides capability to integrate external 3D models into the existing second 3D rendering software view. In some embodiments, a second 3D rendering software user may add the plugin to any second 3D rendering software application code base and use the plugin APIs to splice any existing ARF model (e.g., .rfc) into a second 3D rendering software view at interactive rates. In some embodiments, as a second 3D rendering software camera is moved, the plugin can render one or more external 3D models and integrate them seamlessly into the second 3D rendering software view, matching any existing camera properties such as position, orientation and field of view or vision (FoV), as well as any other second 3D rendering software attribute.

In some embodiments, both color and depth rendering produced by the plugin can integrate with any existing second 3D rendering software geometry to provide a unified view combining geometry from all 3D data sources. In some embodiments of the invention, the plugin can allow users to query/interact with external geometry by supporting 'picking' APIs to return world position and other related data for geometry at a given 2D screen position.

In some embodiments, the disclosed system and method can respect existing depth/z-buffer values during each render pass, only generating additional content if the existing geometry is further from the camera. In some embodiments of the invention, this provides a unified rendering of both the first and second 3D model data geometry. In other embodiments, the depth or z-buffer values can be newly created. Some embodiments can use source model data (e.g., .RVM) parsed by external tools to recognize similar geometries and create a new file optimized for rendering (e.g., .rfc). Some embodiments can use source model data (e.g. .RVM) parsed by one or more internal tools to recognize similar geometries and create a new file optimized for rendering (.rfc).

In some embodiments, the plugin can be Windows® specific and use a proprietary rendering engine to deliver performance via a DirectX® APIs and geometry recognition or instancing across large data sets. In other embodiments, the plugin can be non-specific to Windows® and/or can be specific to any other convention operating system. In some embodiments, the second 3D rendering software can be a third party software, such as Unity®.

Some embodiments can use targeted Windows® APIs that can use platform specific features to drive performance. For example, in one non-limiting embodiments, DirectX® 11 API DrawIndexedInstancedIndirect gives much of the performance to draw many instances of same meshes with minimal overhead per instance. Some embodiments also include using an occlusion rendering pass before rendering final buffers, which can reduce the number of rendered instances for complex render stages.

In some embodiments, the plugin of the system and method can comprise one or more packages of Windows® DLLs that can use an existing second 3D rendering software API to extend the second 3D rendering software render pipeline. In some embodiments, second 3D rendering software scripts can load an existing .rfc into the plugin to initialize the plugin renderer.

In some embodiments, for each frame, a Unity API can make one or more callbacks to an application plugin which then use DirectX to render .rfc into Unity frame buffers respecting depth buffer of any existing the second 3D rendering software geometry. In some embodiments, this can result in a "g-buffer" consisting of color, normal, depth and unique ID of the logical geometry primitive that contributed to the pixel at each screen position. In some embodiments, once completed, the second 3D rendering software render pipeline can continue normally.

In some embodiments, screen buffers generated by a plugin of the system and method disclosed herein can be retained until the next render pass to allow optimized pick queries without re-rendering the scene.

DETAILED DESCRIPTION

Figure 1:
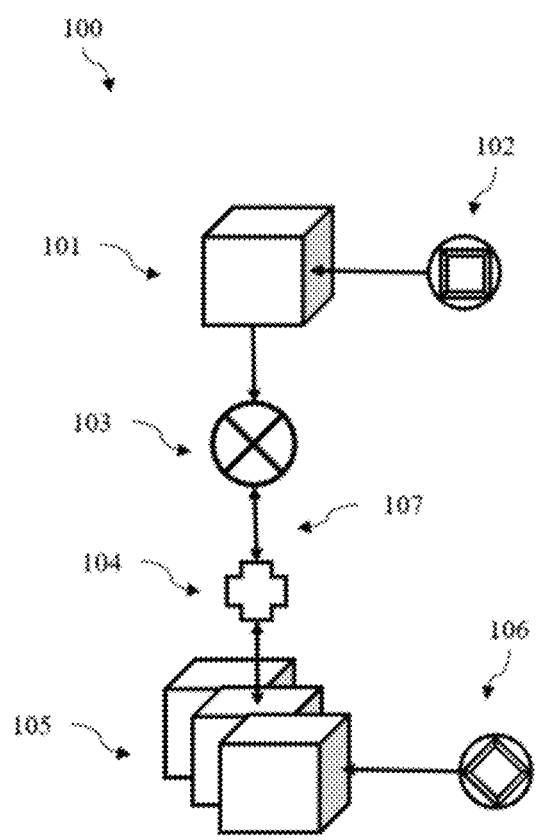
FIG. 1 depicts a portion of the system architecture according to some embodiments.

FIG. 1 depicts a portion of the system architecture 100 according to some embodiments. In some embodiments, the system comprises first 3D rendering software 101. According to some embodiments, first 3D model data 102 is in communication with and/or stored on first rendering software 101. In some embodiments, first rendering software 101 is in communication with a plugin 103.

In some embodiments, the plugin 103 is part of the first 3D rendering software 101. In some embodiments, plugin 103 is part of second 3D rendering software 105. In some embodiments, plugin 103 is part of a third 3D software, such as a cloud based software, for example. In some embodiments, any or all software that comprise part of the system 100 are cloud based software.

According to various embodiments, the system 100 comprises an API 104. In some embodiments, API 104 facilitates connection between the plugin 103 and the second 3D rendering software 105. In some embodiments, API 104 is part of the first 3D rendering software 101. In some embodiments, API 104 is part of second 3D rendering software 105. In some embodiments, API 104 is part of a third 3D software, such as a cloud based software, for example.

According to various embodiments, second 3D model data 106 is in communication with and/or stored on second 3D rendering software 105. According to some embodiments, second 3D model data 106 can be rendered and manipulated using second 3D rendering software 105. In some embodiments, first 3D model data 102 can be imported into second 3D modeling software 105.

According to various embodiments, importing first 3D model data 102 into second 3D modeling software 105 comprises plugin 103 performing a calling operation 107 to API 104 to return second 3D model data 106. In some embodiments, plugin 105 comprises first 3D model data 102. In various embodiments, plugin 104 compares first z-values (not shown) from first 3D model data 102 to second z-values (not shown) from second 3D model data 106. In some embodiments, the plugin 103 determines which first and second z-values are equal. In some embodiments, the plugin 103 creates a g-buffer (not shown). In some embodiments, the g-buffer comprises the first and second z-values where each of the equal first and second z-values are each transformed into a single g-value stored in the g-buffer, thereby eliminating duplicate z-values.

In various embodiments, the g-buffer can comprise a color, a normal, a depth and/or a unique ID of the logical geometry primitive from at least one of the first and second 3D model data. A combined 3D model data comprising the g-buffer is then returned to the API 104 in some embodiments. According to some embodiments, the combined 3D model data is then used to generate a combined 3D rendering in second 3D rendering software 105. In some embodiments, upon manipulation of the combined 3D model rendering, the calling operation 107 is repeated resulting in a new second 3D model rendering comprising new combined 3D model data.

Figure 2:
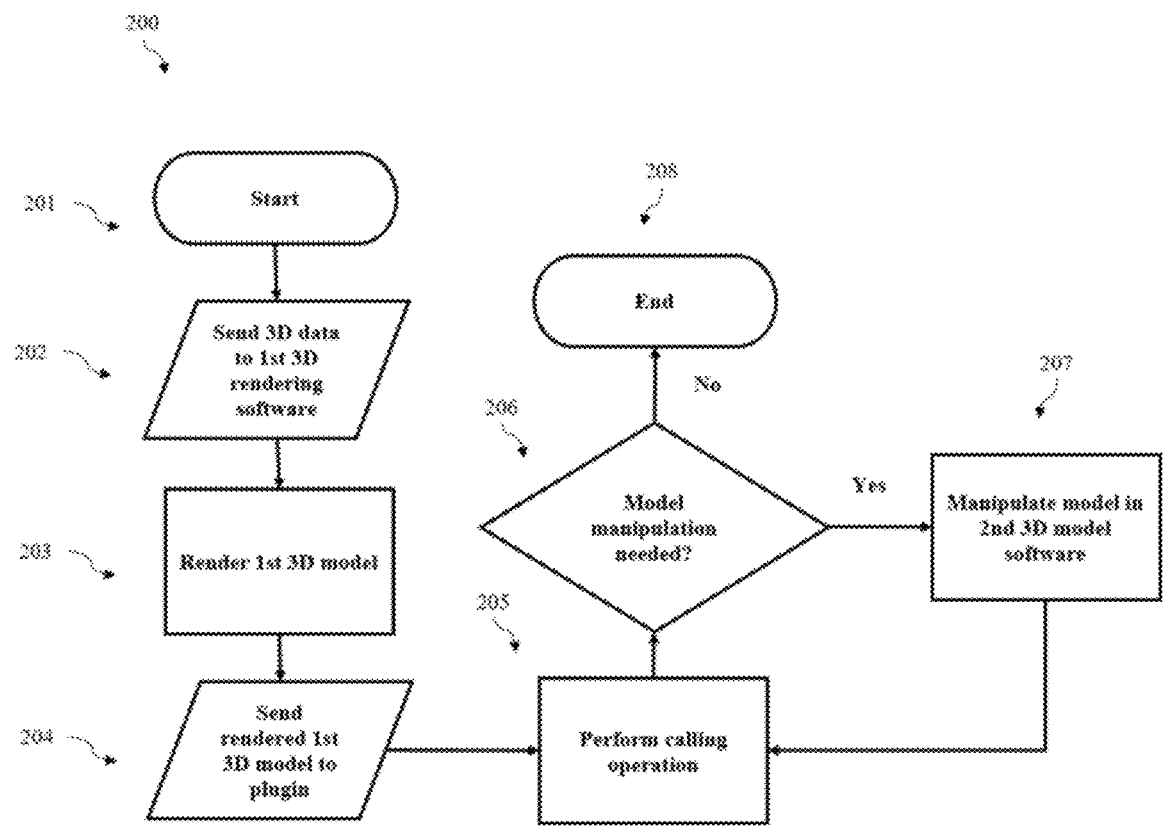
FIG. 2 is a flowchart depicting the instruction executed by the system according to some embodiments.

FIG. 2 is a flowchart 200 depicting the instruction executed by the system according to some embodiments. In some embodiments, execution starts at 201 with sending first 3D model data 102 to the first 3D rendering software 101, shown at 202. At 203, in some embodiments, the first rendering software 101 uses the first 3D model data 102 to create a first 3D model rendering. At 204, in some embodiments, the first 3D model rendering is sent to the plugin 103. At 205, in some embodiments, the plugin 103 performs a calling operation, 107 which is described in more detail later. At 206, in some embodiments, a model manipulation optionally occurs. At 207, if a model manipulation does occur, the calling operation is repeated, resulting in a new combined 3D model rendering for each interactive frame need to support manipulation iterations. At 208, in some embodiments, if a model manipulation does not occur, the execution is complete according to some embodiments.

Figure 3:
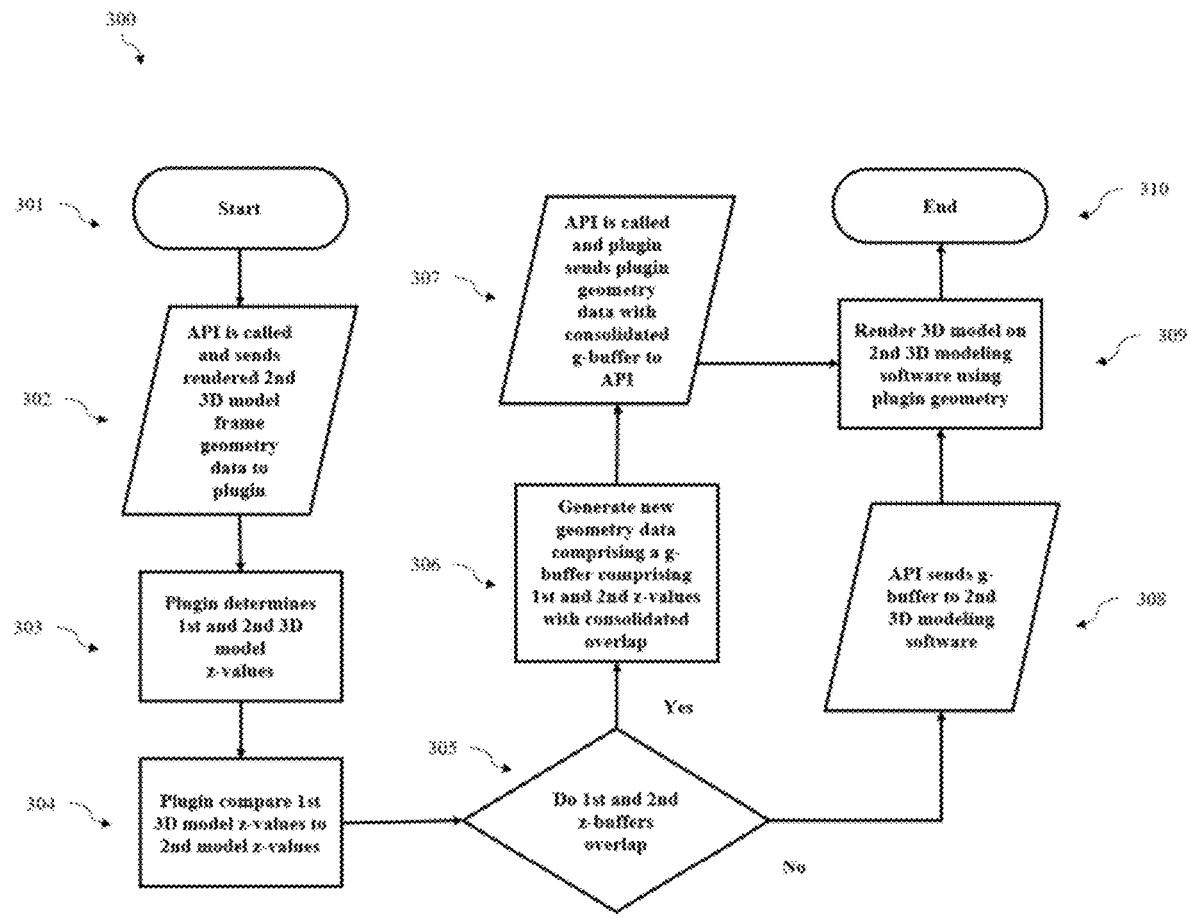
FIG. 3 is a flowchart depicting the instruction executed by the calling operation according to some embodiments.

FIG. 3 is a flowchart 300 depicting the instruction executed by the calling operation 205 according to some embodiments. In some embodiments, execution starts at 301 with the plugin 103 calling the API 104; the API 104 then returns second 3D model data (e.g., z-values, geometry data) 106 to the plugin, which is shown at 302. At 303, in some embodiments, the plugin 103 determines the z-values from the first and second 3D model data. At 304, in some embodiments, the plugin 103 compares the first and second z-values. At 305, in some embodiments, the plugin 103 identifies z-values from the first and second z-values that overlap. At 306, in some embodiments, if there are overlapping first and second z-values, the plugin 107 creates a g-buffer that comprises the first and second z-values, with each equal first and second z-values consolidated into a single z-value. At 307, in some embodiments, the plugin 103 returns the g-buffer to the API. At 308, in some embodiments, if no overlap between first and second z-values exist, the API sends the g-buffer comprising non-overlapping z-values to the second 3D modeling software. At 309, the g-buffer from 307 or 308 is then rendered on the second 3D rendering software, which concludes the calling operation 205 according to some embodiments.

Figure 4:
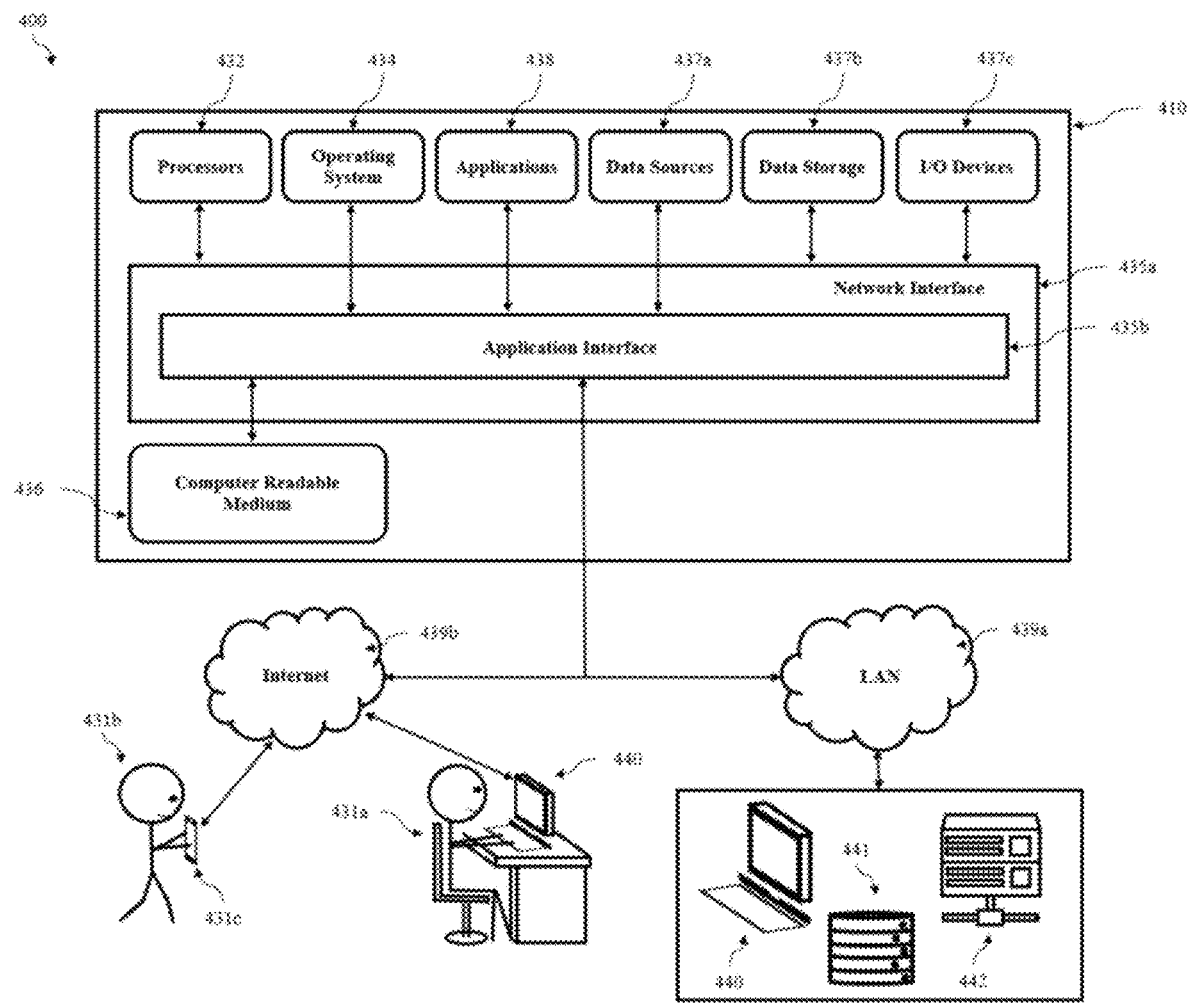
FIG. 4 illustrates a computer system enabling or comprising the systems and methods in accordance with some embodiments of the invention.

FIG. 4 illustrates a system architecture 400 of a computer system 410 enabling or comprising the systems and methods in accordance with some embodiments of the system. In some embodiments, the computer system 410 can operate and/or process computer-executable code of one or more software modules of the aforementioned system and method. Further, in some embodiments, the computer system 410 can operate and/or display information within one or more graphical user interfaces (e.g., HMIs) integrated with or coupled to the system.

In some embodiments, the system 410 can comprise at least one computing device including at least one processor 432. In some embodiments, the at least one processor 432 can reside in, or coupled to, one or more server platforms (not shown). In some embodiments, the system 410 can include a network interface 435a and an application interface 435b coupled to the least one processor 432 capable of processing at least one operating system 434. Further, in some embodiments, the interfaces 435a, 435b coupled to at least one processor 432 can be configured to process one or more of the software modules (e.g., such as enterprise applications 438). In some embodiments, the software modules can include server-based software, and can operate to host at least one user account and/or at least one client account, and operating to transfer data between one or more of these accounts using the at least one processor 432.

With the above embodiments in mind, the system can employ various computer-implemented operations involving data stored in computer systems. Moreover, the above-described databases and models described throughout can store analytical models and other data on computer-readable storage media within the system 410 and on computer-readable storage media coupled to the system 410. In addition, the above-described applications of the system can be stored on computer-readable storage media within the system 410 and on computer-readable storage media coupled to the system 410. These operations are those requiring physical manipulation of physical quantities. Usually, though not necessarily, these quantities take the form of electrical, electromagnetic, or magnetic signals, optical or magneto-optical form capable of being stored, transferred, combined, compared and otherwise manipulated. In some embodiments, the system 410 can comprise at least one computer readable medium 436 coupled to at least one data source 437*a*, and/or at least one data storage device 437*b*, and/or at least one input/output device 437*c*. In some embodiments, the system can be embodied as computer readable code on a computer readable medium 436. In some embodiments, the computer readable medium 436 can be any data storage device that can store data, which can thereafter be read by a computer system (such as the system 410). In some embodiments, the computer readable medium 436 can be any physical or material medium that can be used to tangibly store the desired information or data or instructions and which can be accessed by a computer or processor 432. In some embodiments, the computer readable medium 436 can include hard drives, network attached storage (NAS), read-only memory, random-access memory, FLASH based memory, CD-ROMs, CD-Rs, CD-RWs, DVDs, magnetic tapes, other optical and non-optical data storage devices. In some embodiments, various other forms of computer-readable media 436 can transmit or carry instructions to a computer 440 and/or at least one user 431, including a router, private or public network, or other transmission device or channel, both wired and wireless. In some embodiments, the software modules 438 can be configured to send and receive data from a database (e.g., from a computer readable medium 436 including data sources 437*a* and data storage 437*b* that can comprise a database), and data can be received by the software modules 438 from at least one other source. In some embodiments, at least one of the software modules can be configured within the system to output data to at least one user 431*a*, 431*b* via at least one graphical user interface rendered on at least one digital display.

In some embodiments, of the system, the computer readable medium 436 can be distributed over a conventional computer network via the network interface 435*a* where the system embodied by the computer readable code can be stored and executed in a distributed fashion. For example, in some embodiments, one or more components of the system 410 can be coupled to send and/or receive data through a local area network ("LAN") 439*a* and/or an internet coupled network 439*b* (e.g., such as a wireless internet). In some further embodiments, the networks 439*a*, 439*b* can include wide area networks ("WAN"), direct connections (e.g., through a universal serial bus port), or other forms of computer-readable media 436, or any combination thereof.

In some embodiments, components of the networks 439*a*, 439*b* can include any number of user devices such as personal computers including for example desktop computers, and/or laptop computers, or any fixed, generally non-mobile internet appliances coupled through the LAN 439*a*. For example, some embodiments include one or more of personal computers 440, databases 441, and/or servers 442 coupled through the LAN 439*a* that can be configured for any type of user including an administrator. Other embodiments can include personal computers coupled through network 439*b*. In some further embodiments, one or more components of the system 410 can be coupled to send or receive data through an internet network (e.g., such as network 439*b*). For example, some embodiments include at least one user 431*a*, 431*b*, is coupled wirelessly and accessing one or more software modules of the system including at least one enterprise application 438 via an input and output ("I/O") device 437*c*. In some other embodiments, the system 410 can enable at least one user 431*a*, 431*b*, to be coupled to access enterprise applications 438 via an I/O device 437*c* through LAN 439*a*. In some embodiments, at least one user 4331*a*, 431*b* can comprise a user 431*a* coupled to the system 410 using a desktop computer 440, and/or laptop computers, or any fixed, generally non-mobile internet appliances coupled through the internet 439*b*. In some further embodiments, the user can comprise a mobile user 431*b* coupled to the system 410. In some embodiments, the user 431*b* can use any mobile computing device 431*c* to wireless coupled to the system 410, including, but not limited to, personal digital assistants, and/or cellular phones, mobile phones, or smart phones, and/or pagers, and/or digital tablets, and/or fixed or mobile internet appliances.

Any of the operations described herein that form part of the system are useful machine operations. The system also relates to a device or an apparatus for performing these operations. The apparatus can be specially constructed for the required purpose, such as a special purpose computer. When defined as a special purpose computer, the computer can also perform other processing, program execution or routines that are not part of the special purpose, while still being capable of operating for the special purpose. Alternatively, the operations can be processed by a general-purpose computer selectively activated or configured by one or more computer programs stored in the computer memory, cache, or obtained over a network. When data is obtained over a network the data can be processed by other computers on the network, e.g. a cloud of computing resources.

The embodiments of the system can also be defined as a machine that transforms data from one state to another state. The data can represent an article, that can be represented as an electronic signal and electronically manipulate data. The transformed data can, in some cases, be visually depicted on a display, representing the physical object that results from the transformation of data. The transformed data can be saved to storage generally, or in particular formats that enable the construction or depiction of a physical and tangible object. In some embodiments, the manipulation can be performed by a processor. In such an example, the processor thus transforms the data from one thing to another. Still further, some embodiments include methods can be processed by one or more machines or processors that can be connected over a network. Each machine can transform data from one state or thing to another, and can also process data, save data to storage, transmit data over a network, display the result, or communicate the result to another machine. Computer-readable storage media, as used herein, refers to physical or tangible storage (as opposed to signals) and includes without limitation volatile and non-volatile, removable and non-removable storage media implemented in any method or technology for the tangible storage of information such as computer-readable instructions, data structures, program modules or other data.

Although method operations can be described in a specific order, it should be understood that other housekeeping operations can be performed in between operations, or operations can be adjusted so that they occur at slightly different times, or can be distributed in a system which allows the occurrence of the processing operations at various intervals associated with the processing, as long as the processing of the overlay operations are performed in the desired way.

It is to be understood that the invention is not limited in its application to the details of construction and the arrangement of components set forth in the previous description or illustrated in the drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

The previous discussion is presented to enable a person skilled in the art to make and use embodiments of the invention. Various modifications to the illustrated embodiments will be readily apparent to those skilled in the art, and the generic principles herein can be applied to other embodiments and applications without departing from embodiments of the invention. Thus, embodiments of the invention are not intended to be limited to embodiments shown, but are to be accorded the widest scope consistent with the principles and features disclosed herein. The previous detailed description is to be read with reference to the figures, in which like elements in different figures have like reference numerals. The figures, which are not necessarily to scale, depict selected embodiments and are not intended to limit the scope of embodiments of the invention. Skilled artisans will recognize the examples provided herein have many useful alternatives and fall within the scope of embodiments of the invention.

Although method operations can be described in a specific order, it should be understood that other housekeeping operations can be performed in between operations, or operations can be adjusted so that they occur at slightly different times, or can be distributed in a system which allows the occurrence of the processing operations at various intervals associated with the processing, as long as the processing of the overlay operations are performed in the desired way.

Trademarks, service marks, and/or trade names ("trademarks") of Unity Technologies or its affiliates ("Unity") registered in the U.S. Patent and Trademark Office and in other countries include "Unity". Microsoft and Windows are either a registered trademark or a trademark of Microsoft Corporation in the United States and/or other countries.

The invention claimed is:

1. A system for interactively integrating a first three-dimensional (3D) rendering into a secondary 3D rendering comprising:
   at least one processor,
   at least one non-transitory computer-readable medium,
   at least one first 3D rendering software,
   at least one second 3D rendering software, and
   at least one calling operation;
   wherein each of the at least one first 3D rendering software, the at least one second 3D rendering software, and the at least one calling operation each comprise respective machine executable instruction code, each said respective machine executable instruction code stored on the at least one non-transitory computer-readable medium, each said respective machine executable instruction code executed by the at least one processor; and
   wherein said calling operation comprises instructions configured and arranged to:
   cause second 3D model data to be sent to the at least one first 3D rendering software,
   cause said at least one first 3D rendering software to compare a first 3D model data to said second 3D model data,
   generate combined 3D model data, said combined 3D model data comprising a combination of said first 3D model data and said second 3D model data,
   return said combined 3D model data to the at least one second 3D rendering software, and
   cause the at least one second 3D rendering software to generate a second 3D model rendering comprising the combined 3D model data; and
   wherein said second 3D model rendering can be manipulated.

2. The system of claim 1,
   wherein said first 3D model data and said second 3D model data each comprise first and second z-values, respectively; and
   wherein said generating the combined 3D model data comprises:
   comparing said first z-values to said second z-values, determining which first and second z-values are equal, and
   creating a g-buffer; and
   wherein said g-buffer comprises the first and second z-values, wherein each of said equal first and second z-values are each transformed into a single g-value, thereby eliminating duplicate z-values.

3. The system of claim 2,
   wherein upon manipulation of the second 3D model rendering, the calling operation is repeated resulting in a new second 3D model rendering comprising new combined 3D model data.

4. The system of claim 3,
   wherein said new second 3D model rendering is rendered at an interactive rate of less than or equal to 30 Hz.

5. The system of claim 1,
   wherein said at least one first 3D rendering software comprises at least one plugin comprising a plugin calling operation, and
   wherein said calling operation comprises the plugin calling operation, said plugin calling operation comprising instructions configured and arranged to cause the plugin to:
   receive said second 3D model data sent to the at least one first 3D rendering software,
   compare said first 3D model data to said second 3D model data,
   generate said combined 3D model data, and
   return said combined 3D model data to the at least one second 3D rendering software.

6. The system of claim 5,
   wherein said at least one second 3D rendering software comprises at least one application programing interface (API); and
   wherein said plugin calling operation further comprising instructions configured and arranged to cause said at least one API to:
   receive said second 3D model data,
   send said second 3D model data to said plugin, and
   receive said combined 3D model data from said plugin.

7. A system for interactively integrating a first three-dimensional (3D) rendering into a secondary 3D rendering comprising:
   at least one computer configured and arranged to store and execute:
   at least one first 3D rendering software code,
   at least one second 3D rendering software code, and at least one calling operation code;
wherein said calling operation code comprises instructions configured and arranged to:
  cause second 3D model data to be sent to the at least one first 3D rendering software code,
  cause said at least one first 3D rendering software code to compare first 3D model data to said second 3D model data,
  generate combined 3D model data, said combined 3D model data comprising a combination of said first 3D model data and said second 3D model data,
  return said combined 3D model data to the at least one second 3D rendering software code, and
  cause the at least one second 3D rendering software code to generate a second 3D model rendering comprising the combined 3D model data; and
wherein said second 3D model rendering can be manipulated.

8. The system of claim 7,
wherein said first 3D model data and said second 3D model data each comprise first and second z-values, respectively;
wherein said generating the combined 3D model data comprises:
  comparing said first z-values to said second z-values,
  determining which first and second z-values are equal, and
  creating a g-buffer; and
wherein said g-buffer comprises the first and second z-values, wherein each of said equal first and second z-values are each transformed into a single g-value, thereby eliminating duplicate z-values.

9. The system of claim 8,
wherein upon manipulation of the second 3D model rendering, the calling operation is repeated resulting in a new second 3D model rendering comprising new combined 3D model data.

10. The system of claim 9, wherein said new second 3D model rendering is rendered at an interactive rate of less than or equal to 30 Hz.

11. The system of claim 8,
wherein the g-buffer comprises of color, normal, depth and unique ID of the logical geometry primitive from each of first and second 3D model data.

12. The system of claim 7,
wherein said at least one first 3D rendering software comprises at least one plugin; and
wherein said calling operation comprises a plugin calling operation, said plugin calling operation comprising instructions configured and arranged to cause said plugin to:
  receive said second 3D model data sent to the at least one first 3D rendering software,
  compare said first 3D model data to said second 3D model data,
  generate said combined 3D model data, and
  return said combined 3D model data to the at least one second 3D rendering software.

13. The system of claim 12,
wherein said at least one second 3D rendering software comprises at least one application programing interface (API); and
wherein said plugin calling operation further comprising instructions configured and arranged to cause said at least one API to:
  receive said second 3D model data,
  send said second 3D model data to said plugin, and
  receive said combined 3D model data from said plugin.

14. A system for interactively integrating a primary three-dimensional (3D) rendering into a secondary 3D rendering comprising:
at least one processor,
at least one non-transitory computer-readable medium,
at least one first 3D rendering software,
at least one second 3D rendering software,
at least one plugin,
at least one application programing interface (API), and
at least one plugin calling operation; and
wherein each of the at least one first 3D rendering software, the at least one second 3D rendering software, the at least one plugin, the at least one application programing interface, and the at least one plugin calling operation comprise machine executable code, said each machine executable code stored on at least one non-transitory computer-readable medium, said each machine executable code executed by the at least one processor;
wherein first 3D model data generated by the at least one first 3D rendering software is accessible by the at least one plugin;
wherein second 3D model data generated by the at least one second 3D rendering software is accessible by the at least one API;
wherein the at least one API is in communication with the at least one plugin; and
wherein said plugin calling operation comprises instructions configured and arranged to:
  cause said second 3D model data to be sent to the at least one API,
  cause said at least one API to send said second 3D model data to the plugin,
  cause said plugin to compare said first 3D model data to said second 3D model data,
  generate combined 3D model data, said combined 3D model data comprising a combination of said first 3D model data and said second 3D model data,
  return said combined 3D model data to the at least one API,
  cause the API to send the combined 3D model data to the at least one second 3D rendering software, and
  cause the at least one second 3D rendering software to generate a second 3D model rendering that comprises the combined 3D model data.

15. The system of claim 14,
wherein said first 3D model data and said second 3D model data each comprise first and second z-values, respectively;
wherein said generating the combined 3D model data comprises:
  comparing said first z-values to said second z-values,
  determining which first and second z-values are equal, and
  creating a g-buffer; and
wherein said g-buffer comprises the first and second z-values, wherein each of said equal first and second z-values are each transformed into a single g-value, thereby eliminating duplicate z-values.

16. The system of claim 15,
wherein the g-buffer comprises at least one of a color, a normal, a depth and a unique ID of a logical geometry primitive from each of the first and second 3D model data.

17. The system of claim 16,
wherein upon manipulation of the second 3D model rendering, the calling operation is repeated resulting in a new second 3D model rendering comprising new combined 3D model data.

18. The system of claim 17,
wherein said new second 3D model rendering is rendered at an interactive rate of less than or equal to 30 Hz.

19. A method for interactively integrating a primary three-dimensional (3D) rendering into a secondary 3D rendering comprising the steps of:
providing at least one processor,
providing at least one non-transitory computer-readable medium,
providing at least one first 3D rendering software,
providing at least one second 3D rendering software,
providing at least one plugin,
providing at least one application programing interface (API), and
providing at least one plugin calling operation; and
wherein each of the at least one first 3D rendering software, the at least one second 3D rendering software, the at least one plugin, the at least one application programing interface, and the at least one plugin calling operation comprise machine executable code, said each machine executable code stored on at least one of the at least one non-transitory computer-readable medium, said each machine executable code executed by at least one of the at least one processor;
wherein first 3D model data generated by the at least one first 3D rendering software is accessible by the at least one plugin;
wherein second 3D model data generated by the at least one second 3D rendering software is accessible by the at least one API;
wherein the at least one API is in communication with the at least one plugin; and
wherein said plugin calling operation comprises the following steps:
cause said second 3D model data to be sent to the at least one API,
cause said at least one API to send said second 3D model data to the plugin,
cause said plugin to compare said first 3D model data to said second 3D model data,
generate combined 3D model data, said plugin 3D model data comprising a combination of said first 3D model data and said second 3D model data,
return said combined 3D model data to the at least one API,
cause the API to send the combined 3D model data to the at least one second 3D rendering software, and
cause the at least one second 3D rendering software to generate a second 3D model rendering that comprises the combined 3D model data.

20. The method of claim 19,
wherein said first 3D model data and said second 3D model data each comprise first and second z-values, respectively;
wherein said generating the combined 3D model data further comprises the steps of:
comparing said first z-values to said second z-values,
determining which first and second z-values are equal, and
creating a g-buffer; and
wherein said g-buffer comprises the first and second z-values, wherein each of said equal first and second z-values are each transformed into a single g-value, thereby eliminating duplicate z-values.

* * * * *